(12) United States Patent
Nagasawa (10) Patent No.: US 11,846,841 B2
(45) Date of Patent: Dec. 19, 2023

(54) METHOD FOR MANUFACTURING OPTICAL DEVICE

(71) Applicant: DEXERIALS CORPORATION, Tochigi (JP)

(72) Inventor: Yoshikazu Nagasawa, Tochigi (JP)

(73) Assignee: DEXERIALS CORPORATION, Tochigi (JP)

( * ) Notice: Subject to any disclaimer, the term of this patent is extended or adjusted under 35 U.S.C. 154(b) by 0 days.

(21) Appl. No.: 17/761,871

(22) PCT Filed: Sep. 15, 2020

(86) PCT No.: PCT/JP2020/034835
§ 371 (c)(1),
(2) Date: Mar. 18, 2022

(87) PCT Pub. No.: WO2021/060063
PCT Pub. Date: Apr. 1, 2021

(65) Prior Publication Data
US 2022/0365388 A1    Nov. 17, 2022

(30) Foreign Application Priority Data
Sep. 23, 2019  (JP) ................................. 2019-172391

(51) Int. Cl.
*B32B 27/06*    (2006.01)
*G02F 1/1333*  (2006.01)
(Continued)

(52) U.S. Cl.
CPC ........ *G02F 1/133331* (2021.01); *B32B 27/06* (2013.01); *B32B 37/12* (2013.01);
(Continued)

(58) Field of Classification Search
CPC ...... B32B 2310/0831; B32B 2307/412; B32B 2037/1253; B32B 37/24; B32B 37/12; B32B 27/06; G02F 1/133331
See application file for complete search history.

(56) References Cited

U.S. PATENT DOCUMENTS

2011/0187960 A1*  8/2011  Kobayashi ............ G02F 1/1333
445/25
2019/0044035 A1*  2/2019  Nishimiya ............ H01L 33/505
(Continued)

FOREIGN PATENT DOCUMENTS

JP    2008-032928 A    2/2008
JP    2015-052795 A    3/2015
(Continued)

OTHER PUBLICATIONS

Sep. 20, 2023, European Search Report issued for related EP Application No. 20868058.7.

*Primary Examiner* — Vishal I Patel
(74) *Attorney, Agent, or Firm* — Paratus Law Group, PLLC (57) ABSTRACT

Provide is a method for manufacturing an optical device capable of filling a curable resin composition without protrusion to the periphery even in a manufacturing process of the optical device using a transparent panel having a curved surface shape. The method includes: filling a lamination side of a transparent panel having a curved surface shape with a curable resin composition, curing the curable resin composition filling the lamination side to form a first cured resin layer, forming a dam member on an optical member, laminating the transparent panel and the optical member to form a laminate having a resin filling space surrounded by the dam member, filling the resin filling space with the curable resin composition, precuring the curable resin composition (Continued)

filled in the resin filling space to form a precured resin layer, and final curing the precured resin layer.

10 Claims, 10 Drawing Sheets

(51) Int. Cl.
*B32B 37/12* (2006.01)
*B32B 37/24* (2006.01)

(52) U.S. Cl.
CPC ...... *B32B 37/24* (2013.01); *B32B 2037/1253* (2013.01); *B32B 2307/412* (2013.01); *B32B 2310/0831* (2013.01); *B32B 2457/202* (2013.01); *G02F 2201/50* (2013.01)

(56) References Cited

U.S. PATENT DOCUMENTS

| | | |
|---|---|---|
| 2019/0285878 A1 | 9/2019 | Hansen et al. |
| 2021/0088831 A1 | 3/2021 | Nagasawa |

FOREIGN PATENT DOCUMENTS

| | | |
|---|---|---|
| JP | 2017-026999 A | 2/2017 |
| JP | 2018-141834 A | 9/2018 |
| JP | 2018-146823 A | 9/2018 |
| JP | 2019-049688 A | 3/2019 |
| JP | 2019-053234 A | 4/2019 |

* cited by examiner

METHOD FOR MANUFACTURING OPTICAL DEVICE

TECHNICAL FIELD

The present technology relates to a method for manufacturing an optical device in which a transparent panel for protecting an optical member is laminated to a display side of an optical member such as a liquid crystal display panel via a cured resin layer. This application is a National Stage Patent Application of PCT International Patent Application No. PCT/JP2020/034835, filed Sep. 15, 2020 under 35 U.S.C. § 371, which claims priority based on Japanese Patent Application No. 2019-172391, filed Sep. 23, 2019 in Japan, the entire contents of which are incorporated by reference in this application.

BACKGROUND ART

Conventionally, in optical devices such as liquid crystal display devices used in information terminals such as smartphones or car navigation devices, a light-transmissive cured resin layer is provided between an optical member such as a liquid crystal display panel and a transparent panel for protecting the optical member for the purpose of thinning the device and improving visibility.

For example, a method for forming the cured resin layer includes: applying a photocurable resin composition to a transparent panel to form a curable resin layer; laminating an optical member such as a liquid crystal display panel or an organic EL panel via the curable resin layer; and then curing the curable resin layer (Patent Document 1).

As a method for applying the photocurable resin composition to the transparent panel, there have been used a method in which the photocurable resin composition is discharged from a moving slit nozzle over the entire width to the surface of the transparent panel and a method in which the photocurable resin composition is applied by screen printing, among other methods.

CITATION LIST

Patent Literature

Patent Document 1: Japanese Unexamined Patent Application Publication No. 2015-52795

SUMMARY OF INVENTION

Technical Problem

Recently, a transparent panel curved in one direction has been proposed in order to improve the design and touch feeling of an optical device. For such a curved transparent panel, in order to prevent the curable resin composition from protruding out when applying the curable resin composition to the transparent panel or laminating the transparent panel and the optical member, a method has been proposed that uses a dispenser to form a dam member on peripheral edges of the transparent panel curved in a concave shape or the corresponding optical member, laminates the transparent panel and the optical member, and then supplies the curable resin composition.

The dam member for preventing the protrusion of the curable resin composition is required to be in close contact through the entire length because the injected curable resin composition may protrude out if the degree of the contact of the dam member with the optical member or the transparent panel varies.

Such a close contact property of the dam member is similarly required for a curved surface panel in which one side is curved in a concave or convex shape; however, it is difficult to realize the same in a short time and at a low cost for mass production due to high processing difficulty.

Therefore, it is an object of the present technology to provide a method for manufacturing an optical device capable of filling a curable resin composition without protrusion to the periphery even in a manufacturing process of the optical device using a transparent panel having a curved surface shape.

Solution to Problem

In order to solve the above problem, a method for manufacturing an optical device according to the present technology includes: a step of preparing a transparent panel having a curved surface shape; a first filling step of filling a lamination side of the transparent panel with a curable resin composition; a first final curing step of curing the curable resin composition filled in the lamination side to form a first cured resin layer; a dam forming step of forming, on the transparent panel or an optical member to which the transparent panel is to be laminated, a dam member at a position along peripheral edges of a display region of the optical member; a laminating step of laminating the transparent panel and the optical member to form a lamination in which a resin filling space surrounded by the dam member is formed between the optical member and the transparent panel; a second filling step of filling the resin filling space with the curable resin composition; a precuring step of precuring the curable resin composition filled in the resin filling space to form a precured resin layer; and a second final curing step of final curing the precured resin layer.

Advantageous Effects of Invention

The present technology forms a resin filling space by providing a first cured resin layer to bring the dam member in close contact with it. Therefore, even when using a transparent panel having a curved surface shape, it is possible to achieve a high degree of close contact between the dam member and the first cured resin layer to enable the filling of the resin filling space with the curable resin composition without protrusion.

BRIEF DESCRIPTION OF DRAWINGS

FIGS. 2A and 2B are views illustrating a first filling step of filling a concavely curved lamination side of the transparent panel with a curable resin, wherein

FIGS. 3A and 3B are views illustrating a state in which a panel dam is provided on a convexly curved lamination side of a transparent panel, wherein

FIGS. 4A and 4B are views illustrating a first final curing step for forming a first cured resin layer, wherein

FIGS. 6A and 6B are views illustrating a step of forming a dam member, wherein

FIGS. 8A and 8B are views illustrating a second filling step of filling the resin filling space with the curable resin composition and a precuring step of precuring the curable resin composition filled in the resin filling space to form a precured resin layer, wherein

FIGS. 10A and 10B are views illustrating a second final curing step of final curing a precured resin layer filled in a resin filling space, wherein

MODE FOR CARRYING OUT THE INVENTION

Hereinafter, a method for manufacturing an optical device according to the present technology will be described in detail with reference to the drawings. It should be noted that the present disclosure is not limited to the following embodiments and various modifications can be made without departing from the scope of the present technology. Moreover, the features illustrated in the drawings are shown schematically and are not intended to be drawn to scale. Actual dimensions should be determined in consideration of the following description. Furthermore, those skilled in the art will appreciate that dimensional relations and proportions may be different among the drawings in certain parts.

Optical Device

The present technology provides a method for manufacturing an optical device 1 formed by laminating an optical member 2 and a transparent panel 4 via a cured resin layer 3. The structure of the optical device 1 will be described prior to the description of the laminating process of the transparent panel 4 and the optical member 2.

Figure 1:
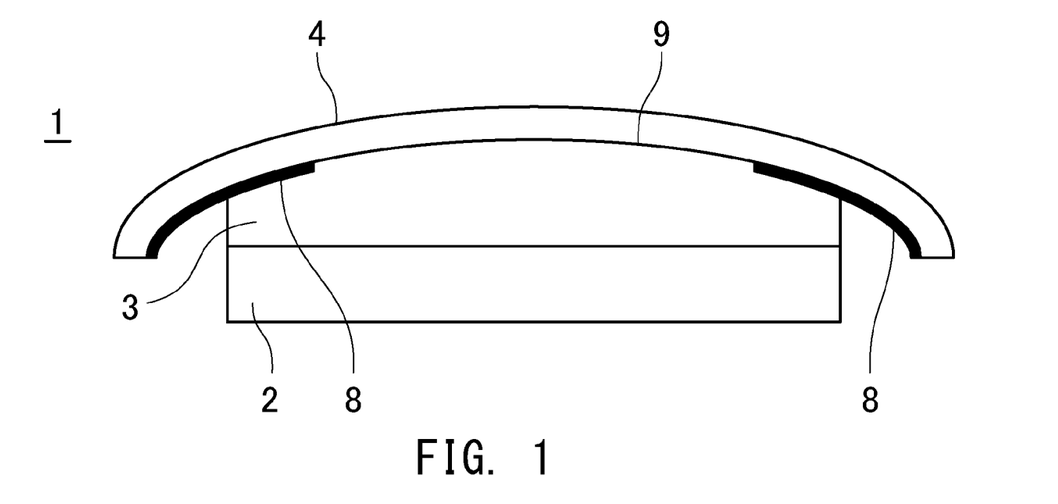
FIG. 1 is a cross-sectional view of an optical device according to the present technology.

The optical device 1 is an optical device such as a liquid crystal display panel and an organic EL display panel, among others, and is used in various information terminals and information devices such as a smartphone, a car navigation device, and an instrument panel, among others. As shown in FIG. 1, the optical device 1 is provided with the light-transmissive cured resin layer 3 between the optical member 2 such as a liquid crystal display panel and the transparent panel 4 for protecting the optical member 2 for the purpose of thinning the device and improving visibility.

Transparent Panel

The transparent panel 4 has light transmissive property and is laminated with the optical member 2 via the cured resin layer 3 to cover and protect the display surface of the optical member 2 while ensuring the visibility of the optical member 2.

The transparent panel 4 may be made of glass or a resin material such as acrylic resin, polyethylene terephthalate, polyethylene naphthalate, or polycarbonate, as long as the transparent panel 4 is optically transparent so that images displayed on the optical member is visible. These materials can be subjected to a single-side or double-side hard coat treatment, antireflection treatment, or the like. When the optical member 2 described later is a touch panel, a part of the member of the touch panel can be used as the transparent panel 4.

On the transparent panel 4, in order to improve the luminance and contrast of the display image, a black frame-shaped light shielding portion 8 called a black matrix is formed in a region corresponding to the peripheral edge of the display region of the optical member 2. In the optical device 1, the inside of the light shielding portion 8 surrounding the display region of the optical member 2 functions as a display portion 9 for transmitting images displayed on the display region of the optical member 2 through the transparent panel 4.

The light shielding portion 8 is formed to have a uniform thickness by applying a coating material colored in black or the like by a screen printing method or the like, and then drying and curing the coating material. The thickness of the light shielding portion 8 is usually 5 to 100 μm.

The transparent panel 4 according to the present technology has a curved surface shape. The curved surface shape of the transparent panel 4 is not particularly limited, and may include a shape concavely curved in one direction as shown in FIG. 1, a shape convexly curved, a rotated paraboloid, a hyperbolic paraboloid, and another quadratic surface shape, as well as a shape having a flat portion in a part of a curved shape or a quadratic surface shape.

It should be noted that the shape of the curving, the dimensional characteristics such as the thickness, and the physical properties such as elasticity of the cover member can be appropriately determined according to the intended use of the optical device 1.

Panel Dam 7

Figure 2A:
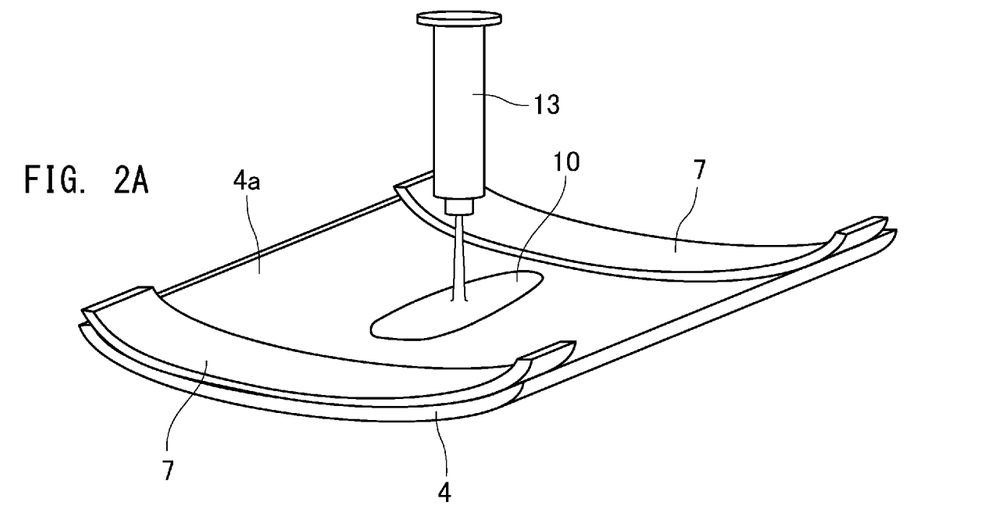
FIG. 2A is a perspective view and FIG. 2B is a cross-sectional view.
Figure 2B:
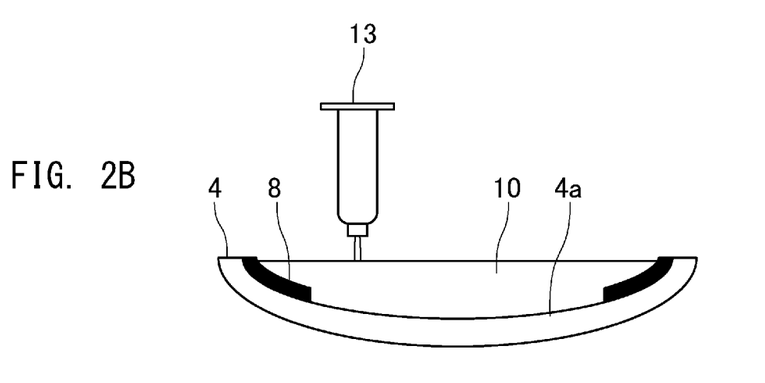
Figure 3A:
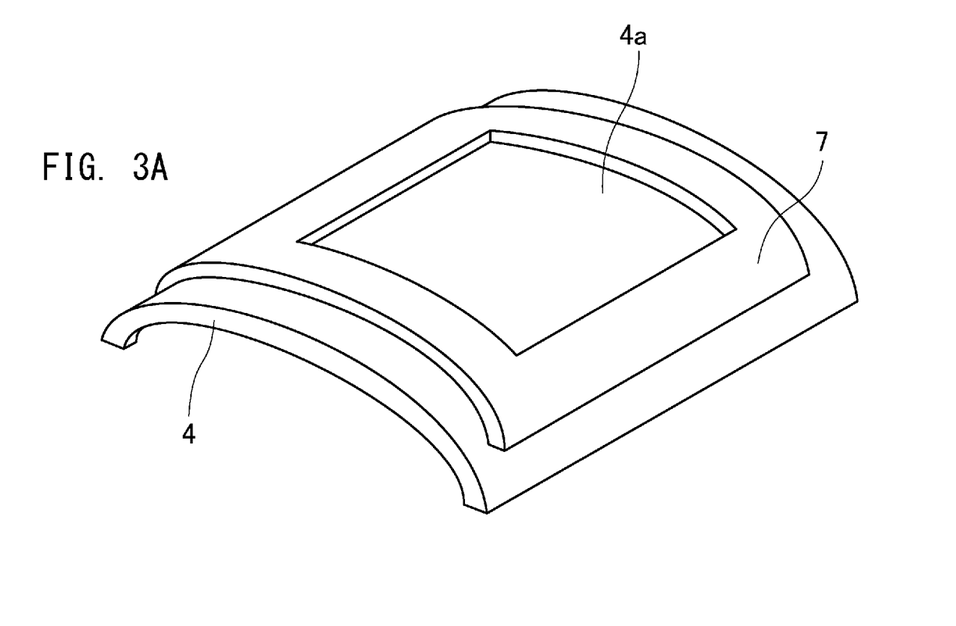
FIG. 3A is a perspective view and FIG. 3B is a cross-sectional view.
Figure 3B:
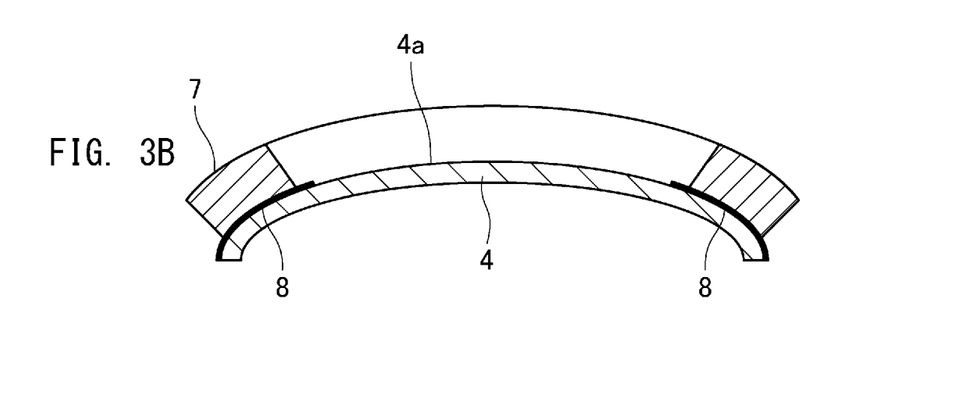

As shown in FIGS. 2A and 2B, the optical device 1 according to the present technology is provided with a panel dam 7 for defining a formation region of a first cured resin layer 15, which will be described later, on a lamination side 4a of the transparent panel 4 to be laminated with the optical member 2. The panel dam 7 is provided so as to fill the space on the transparent panel 4 with a photocurable resin composition 10 constituting the first cured resin layer 15 to prevent the photocurable resin composition 10 from protruding out of the panel dam 7. As shown in FIGS. 2A and 2B, when the lamination side 4a has a concavely curved shape, the panel dam 7 is attached along the outer edges of both open ends of the transparent panel 4 having a curved surface shape. Thus, the panel dam 7 is provided in contact with the light shielding portion 8 formed along the outer edge of the transparent panel 4. Further, as shown in FIGS. 3A and 3B, when the lamination side 4a has a convexly curved shape, the four peripheral sides of the transparent panel 4 are surrounded by the panel dam 7 to prevent protrusion.

The panel dam 7 is formed of, e.g., silicone rubber. The panel dam 7 has a height at least equal to or greater than the thickness of the first cured resin layer 15 described later. The shape of the panel dam 7 is not limited to the belt-like shape shown in FIGS. 2A and 2B, and for example, when the lamination side 4a has a convexly curved shape, it may be a rectangular sheet having an opening larger than the display portion 9 in the center. It should be noted that an appropriate design can be made according to the shape of the first cured resin layer 15.

The panel dam 7 is flexible and can be peeled off from the lamination side 4a, and as shown in FIGS. 2A to 3B, when placed on the lamination side 4a of the transparent panel 4 along the outer edges of both open ends, the panel dam 7 is brought into close contact with the lamination side 4a along the curved surface of the transparent panel 4. Therefore, the panel dam 7 does not need to be processed in accordance with the curved surface shape of the transparent panel 4, can be used for the transparent panel 4 having any curved surface shape, and can cancel the dimensional tolerance of the transparent panel 4 to secure a high degree of close contact. Further, the present manufacturing method using the flexible panel dam 7 eliminates the need for a special jig dedicated to the shape of the transparent panel 4, and can be said to be a manufacturing method suitable for high-mix low-volume production.

The panel dam 7 may be formed by applying and curing the photocurable resin composition 10 along the outer edges of both open ends. The photocurable resin composition 10 is applied to a predetermined height by, e.g., a dispenser and then cured by irradiation with curing light. The photocurable resin composition 10 may be supplied by a known resin supply method such as printing.

The panel dam 7 may be formed of the same resin composition as the photocurable resin composition 10 constituting the first cured resin layer 15 to be described later so as to have the same light transmissive property as the first cured resin layer 15. Therefore, even when the panel dam 7 is formed inside the light shielding portion 8 and in the display portion 9 of the optical device 1 which transmits images displayed on the display region of the optical member 2, the interface with the cured resin layer 3 does not appear in the display portion 9, thereby ensuring display properties and visibility of the optical device 1.

Optical Member

Examples of the optical member 2 include image display members such as a liquid crystal display panel, an organic EL display panel, a plasma display panel, and a touch panel. Here, the touch panel means an image display/input panel which combines a display element such as a liquid crystal display panel and a position input device such as a touch pad. The surface shape of the optical member 2 on the transparent panel 4 side is not particularly limited, but is preferably flat. Moreover, a polarizing plate may be arranged on the surface of the optical member 2.

Cured Resin Layer

The cured resin layer 3 interposed between the transparent panel 4 and the optical member 2 has a light transmissive property and allows visual recognition of images displayed by the optical member 2 such as an image display member.

The photocurable resin composition 10 constituting the cured resin layer 3 is liquid, and exhibits a viscosity of 0.01 to 100 Pa*s (25° C.) when measured with a cone plate type viscometer, for example.

The photocurable resin composition 10 preferably contains a base component (component (a)), an acrylic monomer component (component (b)), a plasticizer component (component (c)) and a photopolymerization initiator (component (d)).

Component (a)

The base component (a) is a film-forming component for the light-transmissive cured resin layer 3 and contains at least one of an elastomer and an acrylic oligomer. Also, both of the elastomer and the acrylic oligomer may be used in combination as the component (a).

Preferable examples of the elastomer include acrylic copolymer preferably consisting of acrylic ester, polybutene, and polyolefin, among others. The weight average molecular weight of the acrylic ester copolymer is preferably 5,000 to 500,000, and the number of repetitions n of polybutene is preferably 10 to 10,000.

Preferred examples of acrylic oligomers include (meth) acrylate oligomers having a backbone of polyisoprene, poly-urethane, and polybutadiene, among others. In the present specification, the term "(meth) acrylate" includes acrylate and methacrylate.

Preferred examples of (meth) acrylate oligomers having a polyisoprene backbone include esterified product of maleic anhydride adduct of polyisoprene polymer and 2-hydroxy-ethyl methacrylate UC102 (KURARAY) (molecular weight in terms of polystyrene: 17,000), UC203 (KURARAY) (molecular weight in terms of polystyrene: 35,000), and UC-1 (KURARAY) (molecular weight about 25,000).

Preferred examples of the (meth) acrylic-type oligomers having a polyurethane backbone include aliphatic urethane acrylate (EBECRYL 230 (Daicel-Cytec) (molecular weight of 5,000) and UA-1 (Light Chemical)), among others.

For (meth) acrylate oligomer, known (meth) acrylate oligomer having a polybutadiene backbone may be employed.

Component (b)

The acrylic monomer component (b) is used as a reactive diluent in order to impart sufficient reactivity and applicability to the photocurable resin composition in the manufacturing step of the optical device. Examples of such acrylic monomers include 2-hydroxypropyl methacrylate, benzyl acrylate, and dicyclopentenyloxyethyl methacrylate, among others.

It should be noted that the total content of the base component (a) and the acrylic monomer component (b) in the photocurable resin composition 10 is preferably 25 to 85% by mass.

Component (c)

The plasticizer component (c) is used to impart a buffer property to the cured resin layer and to reduce the cure shrinkage of the photocurable resin composition, and does not react with the acrylate oligomer component of the component (a) and the acrylic monomer component of the component (b) during irradiation of an ultraviolet-ray. Such plasticizer components contain a solid tackifier (1) and a liquid oil component (2).

Examples of the solid tackifier (1) include: terpene-based resins such as terpene resin, terpene phenol resin, and hydrogenated terpene resin; rosin-based resins such as natural rosin, polymerized rosin, rosin ester, and hydrogenated rosin; and terpene-based hydrogenated resins, among others. In addition, non-reactive oligomers obtained by low molecular weight polymerizing the above-mentioned acrylic monomers in advance can also be used; specifically, copolymers of butyl acrylate and 2-hexyl acrylate and acrylic acid, or copolymers of cyclohexyl acrylate and methacrylic acid can be used.

The liquid oil component (2) may contain a polybutadiene type oil or a polyisoprene type oil.

The content of the plasticizer component (c) in the photocurable resin composition 10 is preferably 10 to 65% by mass.

Component (d)

As the photopolymerization initiator designated as the component (d), known photo radical polymerization initiators can be used, which include 1-hydroxy-cyclohexyl phenyl ketone (IRGACURE 184, BASF), 2-hydroxy-1-{4-[4-(2-hydroxy-2-methyl-propionyl) benzyl] phenyl}-2-methyl-1-propan-1-one (IRGACURE 127, BASF), benzophenone, and acetophenone, among others.

Insufficient amount of such a photopolymerization initiator relative to 100 parts by mass in total of the base component (a) and the acrylic monomer component (b) result in insufficient curing at the time of ultraviolet irradiation and excessive amount tends to cause problems of foaming since cleavage will increase outgas sing; the amount, therefore, is preferably 0.1 to 5 parts by mass, and more preferably 0.2 to 3 parts by mass.

The photocurable resin composition 10 can also contain a chain transfer agent for the purpose of adjusting the molecular weight. For example, 2-mercaptoethanol, lauryl mercaptan, glycidyl mercaptan, mercaptoacetic acid, 2-ethylhexyl thioglycolate, 2,3-dimethyl capto-1-propanol, and α-methylstyrene dimer may be used.

The photocurable resin composition 10 may further contain, if necessary, general additives including an adhesion improver such as a silane coupling agent and an antioxidant. Further, with regard to the components (a) to (d) of the photocurable resin composition 10, the component (a) may not be used if appropriate components (b) and (c) are employed.

Manufacturing Steps

Next, a first manufacturing steps of the optical device 1 will be described. The manufacturing steps of the optical device 1 includes: a step (A) of preparing a transparent panel having a curved surface shape; a first filling step (B) of filling a lamination side of the transparent panel with a curable resin composition; a first final curing step (C) of curing the curable resin composition filled in the lamination side to form a first cured resin layer; a dam forming step (D) of forming, on the transparent panel or an optical member to which the transparent panel is to be laminated, a dam member at a position along peripheral edges of a display region of the optical member; a laminating step (E) of laminating the transparent panel and the optical member to form a laminate in which a resin filling space surrounded by the dam member is formed between the optical member and the transparent panel; a second filling step (F) of filling the resin filling space with the curable resin composition; a precuring step (G) of precuring the curable resin composition filled in the resin filling space to form a precured resin layer; and a second final curing step (H) of final curing the precured resin layer.

Step a: Transparent Panel

First, the transparent panel 4 having a curved surface shape is prepared. As described above, the light shielding portion 8 is formed on one surface of the transparent panel 4 to which the optical member 2 is to be bonded. The light shielding portion 8 is formed so as to surround the display region of the optical member 2.

In the transparent panel 4, the panel dam 7 is provided on the lamination side 4a to be filled with the curable resin composition 10 (see FIG. 2A). As described above, the panel dam 7 is provided by bringing a flexible member such as silicone rubber into close contact with the transparent panel 4 along the curved surface thereof.

Specifically, as shown in FIGS. 2A and 2B, when the lamination side 4a has a concavely curved shape, the panel dam 7 is attached along the outer edges of both open ends of the transparent panel 4 having the curved surface shape. Further, as shown in FIGS. 3A and 3B, when the lamination side 4a has a convexly curved shape, the panel dam 7 is provided on four sides surrounding the region corresponding to the display portion 9 of the transparent panel 4. When the lamination side 4a has a concavely curved shape, band-shaped panel dams 7 are brought into close contact with the portions along the outer edges of both open ends. When the lamination side 4a has a convexly curved shape, band-shaped silicone rubbers are brought into close contact with the four-sides without gaps, or a rectangular sheet-like panel dam 7 having an center opening larger than the display portion 9 is brought into close contact with it.

Step B: First Filling Step

Next, for example, as shown in FIGS. 2A and 2B, a first filling step is performed for filling the lamination side of the transparent panel with a curable resin. The photocurable resin composition 10 can be suitably used as the curable resin. The photocurable resin composition 10 is injected into the lamination side 4a by, e.g., a dispenser 13. The curable resin composition 10 is filled to a predetermined height.

For example, as shown in FIG. 2B, the curable resin composition 10 is filled up to a height which covers the light shielding portion 8. Further, the curable resin composition 10 having fluidity may be left for a while as necessary after filling to make it substantially horizontal on the lamination side 4a of the transparent panel 4.

Step C: First Final Curing Step

Figure 4A:
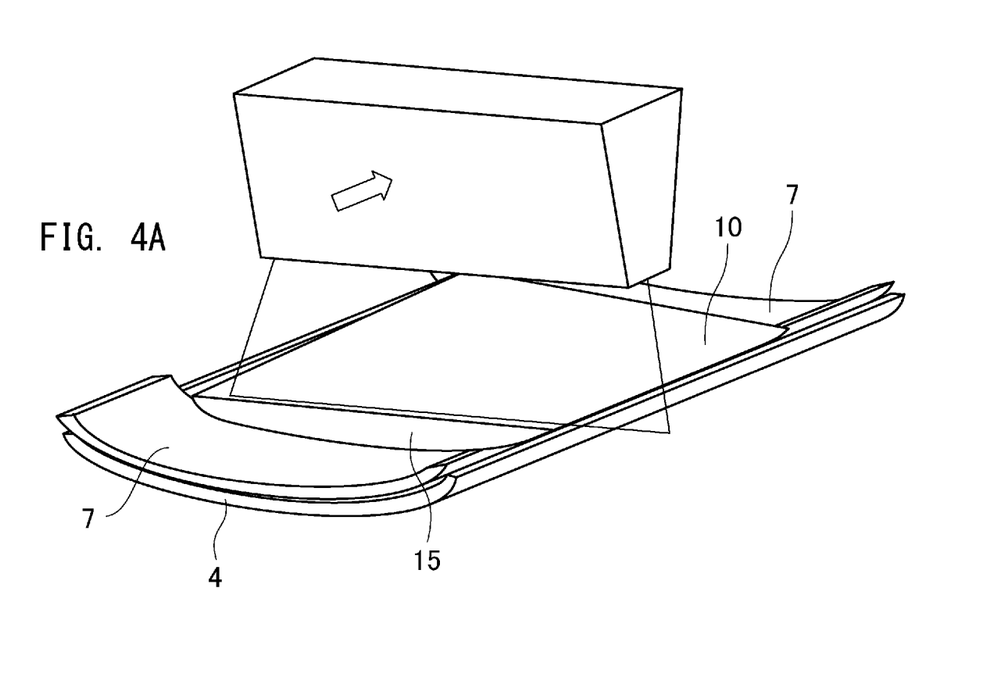
FIG. 4A is a perspective view and FIG. 4B is a cross-sectional view.
Figure 4B:
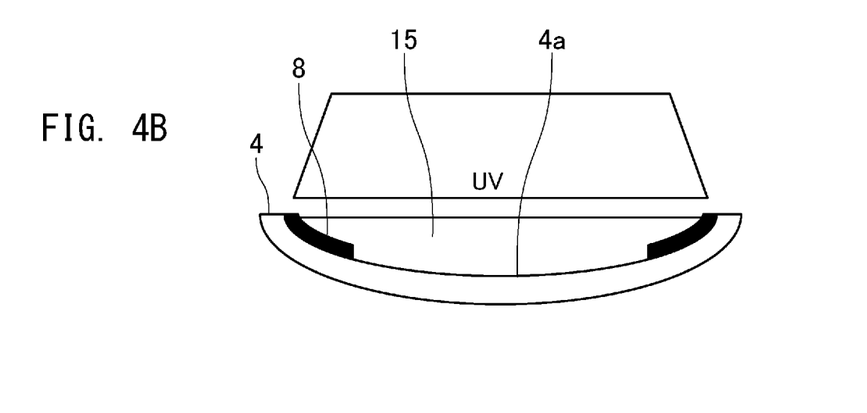

Next, a first final curing step is performed for curing the curable resin filled in the lamination side 4a to form the first cured resin layer 15. When the curable resin composition 10 is used as the curable resin, for example, the entire surface of the curable resin composition 10 is irradiated with curing light from above the light shielding portion 8, as shown in FIGS. 4A and 4B. Thus, the first cured resin layer 15 is formed on the lamination side 4a of the transparent panel 4. Thereafter, the panel dam 7 is removed, and the first cured resin layer 15, which is substantially flat, is formed on the lamination side 4a of the transparent panel 4. When the panel dam 7 is formed by curing the photocurable resin composition 10, it is integrated with the first cured resin layer 15 without removal.

The first cured resin layer 15 is formed up to the portion above the light shielding portion 8. The curing light, which is irradiated from above the light shielding portion 8 without being blocked by the light shielding portion 8, can completely cure the first cured resin layer 15. The first cured resin layer 15 has a flat surface between the side edges having the curvature of the transparent panel 4.

Figure 5:
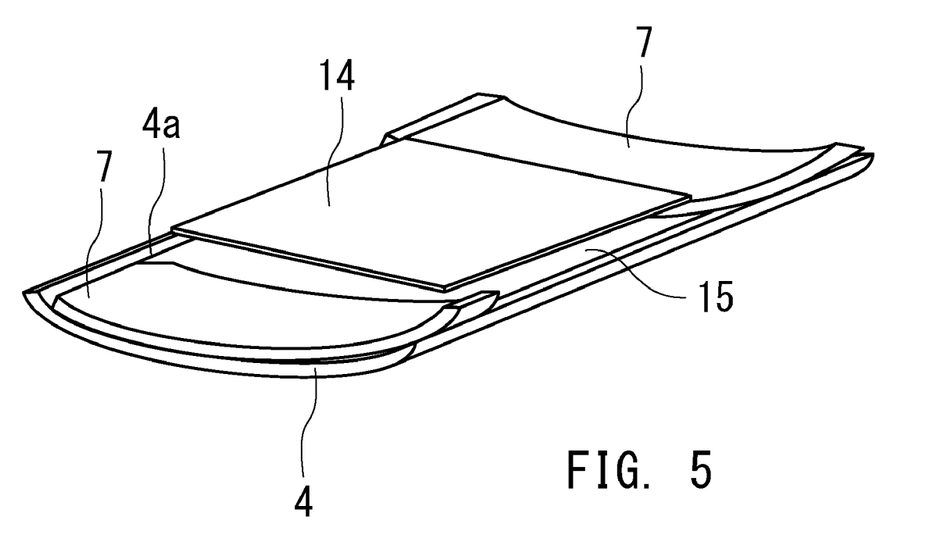
FIG. 5 is a perspective view illustrating a state in which a flat cover member is superimposed over the surface of a first cured resin layer 15.

As shown in FIG. 5, if necessary, a releasable, light-transmissive, flat cover member 14 may be superimposed over the surface of the first cured resin layer 15, and the cover member may be left for a while. Thus, by the final curing step of the first cured resin layer 15, the influence of the curing shrinkage of the first cured resin layer 15 on the optical member 2 to be laminated can be previously eliminated before the second final curing step, which will be described later.

Step D: Dam Forming Step

Figure 6A:
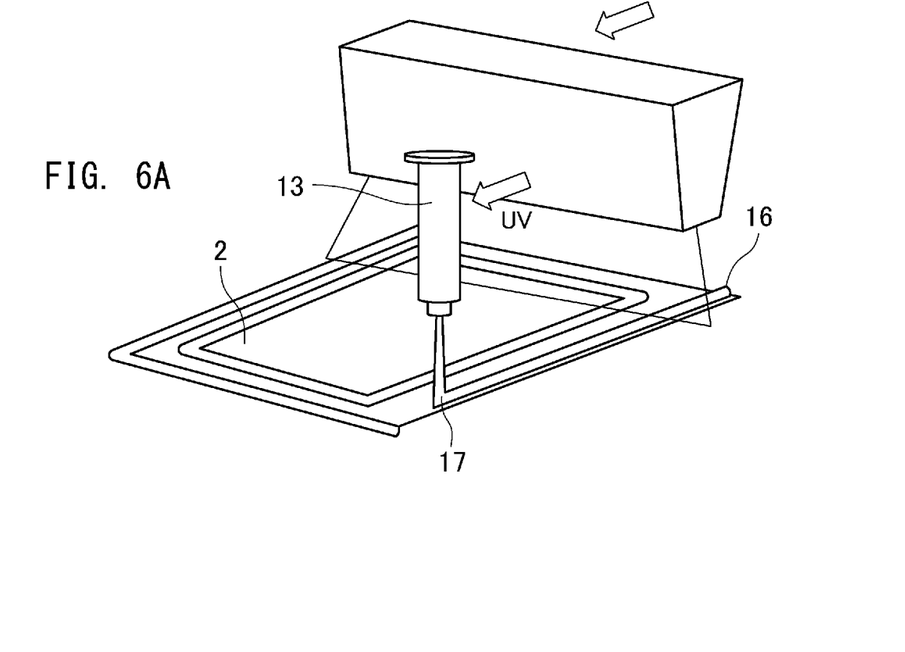
FIG. 6A is a perspective view and FIG. 6B is a cross-sectional view.
Figure 6B:
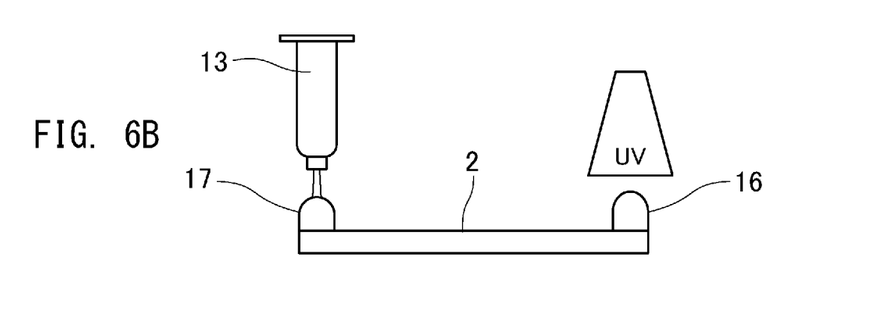

Next, a dam forming step is performed for forming a dam member 16 along the position corresponding to outer edges of the display region of the optical member 2 to which the transparent panel 4 is to be laminated. The dam member 16 is formed by applying and curing a second curable resin composition 17 along the outer edges of the display region of the optical member 2. As shown in FIGS. 6A and 6B, the second curable resin composition 17 is applied to a predetermined height by, e.g., the dispenser 13. When a photocurable resin composition is used as the second curable resin composition 17, the second curable resin composition 17 is cured by irradiation with curing light after the application. Alternatively, the second curable resin composition 17 may be supplied by a known resin supply method such as printing.

The dam member 16 is preferably formed of the same resin composition as the photocurable resin composition 10 constituting the cured resin layer 3. The dam member 16 having the same light transmissive property as the cured resin layer 3 will transmit light in the same manner as the cured resin layer 3 even when the dam member 16 is formed inside the light shielding portion 8 and on the display portion 9 of the optical device 1 which transmits images displayed on the display region of the optical member 2. Further, the dam member 16 in contact with the cured resin layer 3 will not impair the display properties and visibility of the optical device 1 by forming it with the same curable resin composition as the cured resin layer 3 to make the interface between the dam member 16 and the cured resin layer 3 in the display portion 9 inconspicuous.

Subsequently, the cured dam member 16 having elasticity and high adhesiveness is pressed against the transparent panel 4 and deformed to be brought into close contact with the first cured resin layer 15 of the transparent panel 4. Thus, the dam member 16 forms a resin filling space 20 to be filled with the photocurable resin composition 10 between the optical member 2 and the transparent panel 4, thereby preventing liquid leakage of the photocurable resin composition 10. The application height of the second curable resin composition 17 is determined by subtracting the thickness of the first cured resin layer 15 from the predetermined thickness of the cured resin layer 3 and considering the deformation amount of the dam member 16.

The dam member 16 may be formed on the first cured resin layer 15 formed on the transparent panel 4 instead of forming it on the optical member 2, or may be formed on both the optical member 2 and the first cured resin layer 15.

The dam member 16 formed in a substantially frame shape is preferably provided with at least one opening. The opening has a role of an injection hole for injecting the photocurable resin composition 10 into the resin filling space 20 and an exhaust hole for exhausting air in the resin filling space 20. The opening has an opening diameter through which the dispenser 13 for injecting the photocurable resin composition 10 can be inserted (see FIGS. 8A and 8B) and air in the resin filling space 20 can be exhausted. The opening may be formed at any position of the dam member 16, but is preferably provided at an position above the light shielding portion 8. Further, by forming the opening in the vicinity of the corner part, the photocurable resin composition 10 can be injected with the opening part directed vertically upward, and the exhaust of air in the resin filling space 20 can be prevented from being inhibited by the dam member 16, so that the resin filling space 20 is surely filled with the photocurable resin composition 10. There may be formed a plurality of openings that can be used, e.g., as injection holes for the photocurable resin composition 10 and exhaust holes for air in the resin filling space 20.

Step E: Laminating Step

Figure 7:
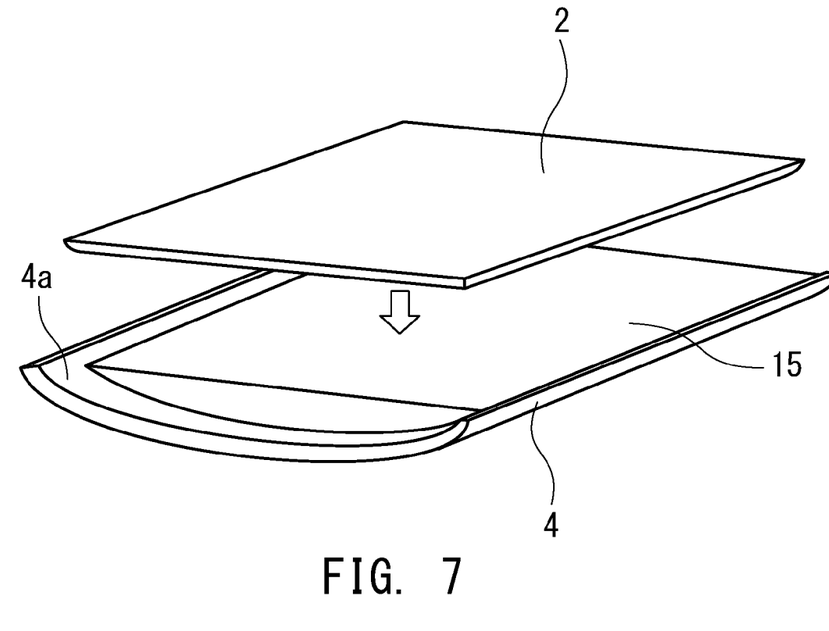
FIG. 7 is a perspective view illustrating a laminating step of forming a laminate.

Next, as shown in FIG. 7, a laminating step is performed for laminating the transparent panel 4 and the optical member 2 to form a laminate 21 in which the resin filling space 20 surrounded by the dam member 16 is formed between the optical member 2 and the transparent panel 4.

The transparent panel 4 and the optical member 2 are supported by fixing plates (not shown) provided on the respective rear surfaces opposite to each lamination side. The laminate 21 is formed by arranging the transparent panel 4 and the optical member 2 so that the light shielding portion 8 and the dam member 16, which are respectively formed in a frame shape, face each other and sandwiching them by a pair of fixing plates.

At this time, the dam member 16 is preferably positioned on the inner edge of the light shielding portion 8 or positioned inside the inner edge of the light shielding portion 8. In other words, the resin filling space 20 surrounded by the dam member 16 is preferably inside the light shielding portion 8. This is because it is necessary to prevent the resin filling space 20 filled with the photocurable resin composition 10 from becoming a blind spot of the light shielding portion 8 when the curing light is irradiated from the front surface side opposite to the lamination side 4a of the transparent panel 4 as will be described later.

As described above, the dam member 16 having elasticity and high adhesiveness is pressed against the first cured resin layer 15 of the transparent panel 4 and deformed to be brought into close contact with it. Thus, in the laminate 21, the resin filling space 20 to be filled with the photocurable resin composition 10 is formed by the optical member 2, the first cured resin layer 15, and the dam member 16. In the resin filling space 20, the dam member 16 is brought into close contact with the first cured resin layer 15 to prevent liquid leakage of the photocurable resin composition 10. When an opening is formed in the dam member 16, the photocurable resin composition 10 can be injected into the resin filling space 20 through this opening. As described above, one or more openings may be formed in the resin filling space.

The first cured resin layer 15 has a flat surface, and the dam member 16 abuts on the flat surface of the first cured resin layer 15 in the laminating step. Therefore, the dam member 16 is more likely to be brought into close contact as compared with when the dam member 16 abuts on the curved surface of the transparent panel 4, thereby reliably preventing liquid leakage of the photocurable resin composition 10.

Step F: Second Filling Step

Figure 8A:
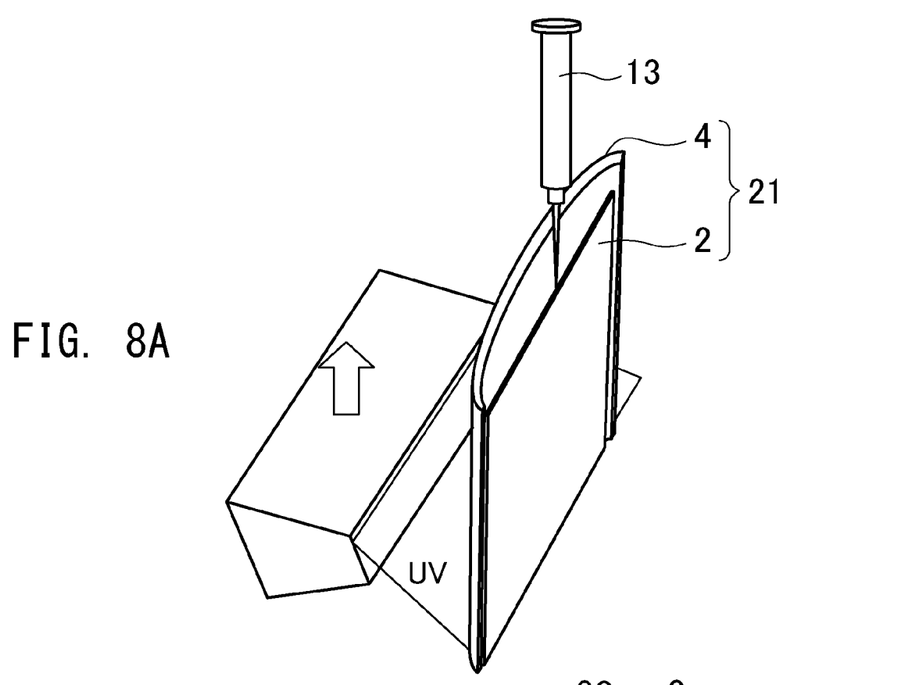
FIG. 8A is a perspective view and FIG. 8B is a cross-sectional view of the laminate.
Figure 8B:
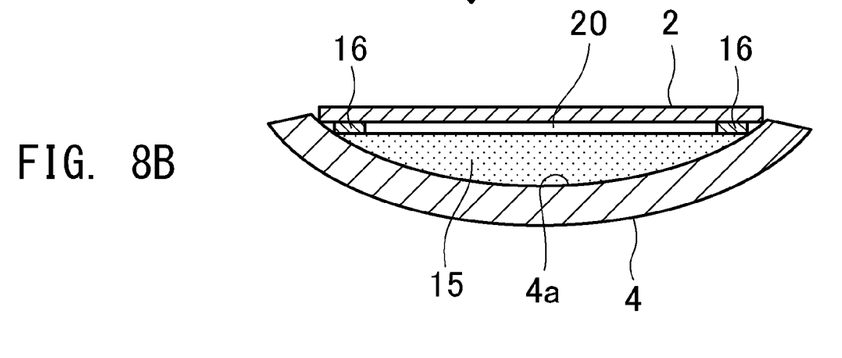

Next, as shown in FIGS. 8A and 8B, a second filling step is performed for filling the resin filling space 20 with the curable resin composition. The curable resin is preferably the photocurable resin composition 10 that is same as the photocurable resin composition 10 constituting the first cured resin layer 15. The photocurable resin composition 10 is injected into the resin filling space 20 by, e.g., the dispenser 13.

When an opening is formed in the resin filling space 20, the photocurable resin composition 10 is injected with the dispenser 13 through the opening. At this time, by injecting the photocurable resin composition 30 with the opening directed upward, the air in the resin filling space 20 is exhausted from the opening to prevent the occurrence of voids.

The filling step of the photocurable resin composition 10 is preferably performed by tilting the laminate 21 so that the opening is positioned at the uppermost position in the vertical direction. Thus, the air in the resin filling space 20 flows toward the opening side, thereby preventing the air from remaining as voids in corners or the like of the resin filling space 20.

Although the dispenser 13 can inject the photocurable resin composition 10 as long as the nozzle tip is inserted into the opening, the photocurable resin composition 10 can be injected at a high speed while preventing entrainment of air by dipping the tip into the photocurable resin composition 10 already injected in the resin filling space 20. After completion of filling the photocurable resin composition 10, the dispenser 13 is removed from the resin filling space 20.

Step G: Precuring Step

Next, as shown in FIGS. 8A and 8B, a precuring step is performed for precuring the curable resin composition filled in the resin filling space 20 to form a precured resin layer 22. For example, when the resin filling space 20 is filled with the photocurable resin composition 10, the resin filling space 20 is irradiated with curing light such as ultraviolet rays from the transparent panel 4 side to precure the photocurable resin composition 10, thereby forming the precured resin layer 22.

In addition, when the laminate 21 is tilted so that the opening is positioned at the uppermost position in the vertical direction in the second filling step, the precuring step may be performed while the laminate 21 is returned to the horizontal position. This avoids the formation of an unfilled portion of the photocurable resin composition 10 near the opening of the resin filling space 20 which would otherwise occur due to the inclination of the laminate 21. Therefore, the curing light can be irradiated in a state where the photocurable resin composition 10 is injected up to the opening and the entire display region is filled with the photocurable resin composition 10.

In a method for manufacturing an optical device according to the present technology, the filling step of filling the resin filling space 20 with the photocurable resin composition 10 and the precuring step of precuring the photocurable resin composition 10 filled in the resin filling space 20 may be performed in parallel. In other words, while injecting the photocurable resin composition 10 into the resin filling space 20, the photocurable resin composition 10 filled in the resin filling space 20 may be irradiated with curing light to sequentially progress the curing reaction.

By sequentially curing the photocurable resin composition 10 before the entire resin filling space 20 is filled with the photocurable resin composition, it is possible to suppress the increase in the internal pressure, which would be caused by injecting the uncured photocurable resin composition 10 into the resin filling space 20, to reduce the load on the transparent panel 4 and the optical member 2, which are becoming thinner, thereby forming the precured resin layer 22 with a uniform thickness.

Further, performing the filling step and the curing step of the photocurable resin composition 10 in parallel can reduce the manufacturing time.

Figure 9:
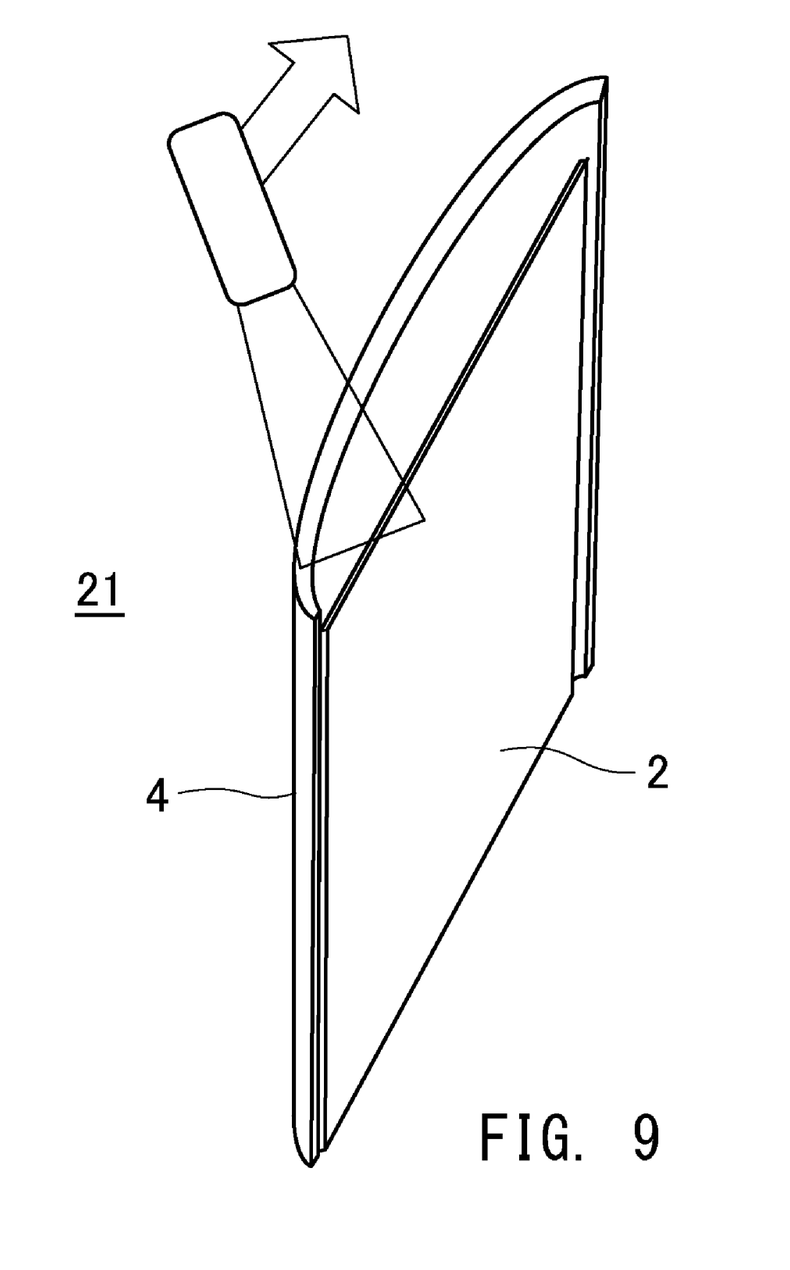
FIG. 9 is a perspective view illustrating a step of irradiating the opening of the laminate used for filling with curing light.

The opening can be surely sealed by injecting the photocurable resin composition 10 into the opening and irradiating the opening with curing light from the side surface of the laminate 21 toward the opening portion to final cure the photocurable resin composition 10 in the opening as shown in FIG. 9.

Step H: Second Final Curing Step

Figure 10A:
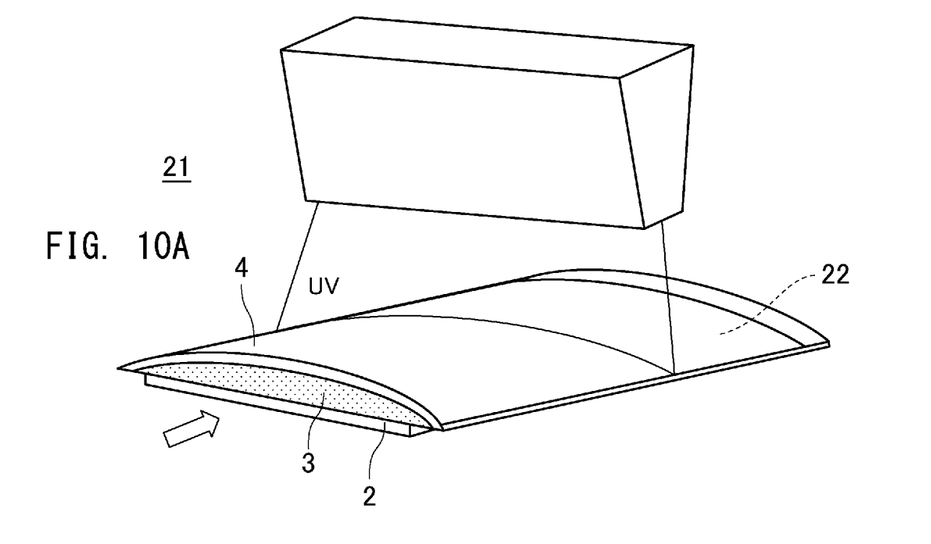
FIG. 10A is a perspective view and FIG. 10B is a cross-sectional view.
Figure 10B:
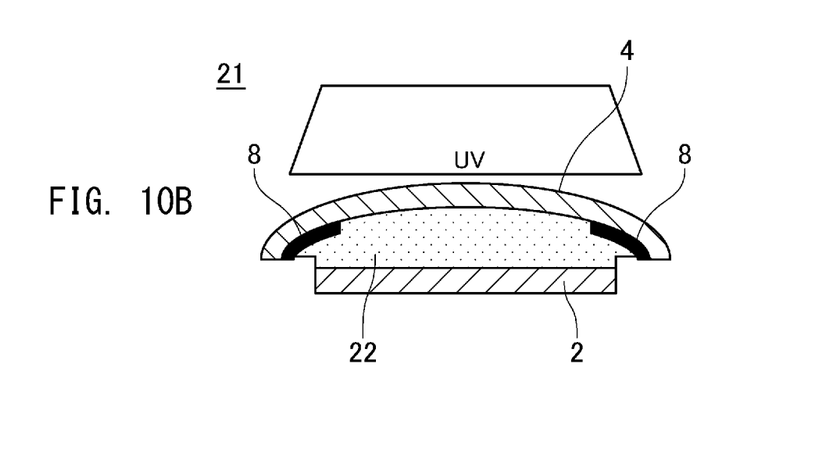

Next, a final curing step is performed for final curing the precured resin layer 22 formed in the resin filling space 20. The final curing step can final cure the precured resin layer 22 by irradiating the resin filling space 20 with curing light such as ultraviolet light from the transparent panel 4 side as shown in FIGS. 10A and 10B, for example. The first cured resin layer 15 and the final-cured precured resin layer 22 become the cured resin layer 3.

Thus, the optical member 2 and the transparent panel 4 are laminated via the cured resin layer 3 to complete the optical device 1 as shown in FIG. 1. The present manufacturing method can efficiently final cure the precured resin layer 22 by previously forming the first cured resin layer 15. In the second final curing step, curing light is irradiated from the front surface side of the transparent panel 4. Here, increasing the curvature of the transparent panel 4 will increase the amount and thickness of the resin filled in the lamination side 4a in the first filling step. Further, the uncured resin absorbs curing light. Therefore, even if the curable resin filled in the resin filling space 20 is irradiated with curing light from the front surface side of the transparent panel 4, when uncured resin is interposed, it takes time to cure the curable resin filled in the lamination side 4a and the resin filling space 20.

In this regard, the present technology can efficiently cure the curable resin filled in the resin filling space 20 by final curing the curable resin filled in the lamination side 4a in advance. The irradiation of the curing light in the first final curing step and the second final curing step may be performed a plurality of times as required.

In place of the precuring step, the present technology may include a second final curing step for final curing the photocurable resin composition 10 filled in the resin filling space 20. In other words, after filling the resin filling space 20 with the photocurable resin composition 10, the photocurable resin composition 10 may be final cured immediately by irradiation with curing light without precuring. This can reduce the time for manufacturing the optical device 1.

This method for manufacturing the optical device 1 forms the resin filling space 20 by providing the flat first cured resin layer 15 and the dam member 16 closely contact therewith. Therefore, even when using the transparent panel 4 having a curved surface shape, it is possible to achieve a high degree of close contact between the dam member 16 and the first cured resin layer 15, to enable the filling of the resin filling space 20 without protrusion of the curable resin composition.

In the optical device 1 manufactured by such a process, the display region inside the light shielding portion 8 is the display portion 9 for transmitting images displayed on the display region of the optical member 2. By forming the first cured resin layer 15 and the precured resin layer 22 with the same resin composition, the display portion 9 will not impair the display properties and visibility. Even when the dam member 16 is positioned in the display portion 9, forming the dam member 16 and the cured resin layer 3 with the same resin composition will make the interface between the dam member 16 and the cured resin layer 3 inconspicuous, thereby ensuring display properties and visibility.

As described above, in the optical device 1, the resin filling space 20 surrounded by the dam member 16 is formed inside the light shielding portion 8, so that the resin filling space 20 appears on the display portion 9 side of the transparent panel 4, that is, the light shielding portion 8 does not cause a blind spot. Thus, the first cured resin layer 15 and the precured resin layer 22 in the resin filling space 20 can be irradiated with curing light through the transparent panel 4, thereby eliminating uncured portions.

EXAMPLES

Next, examples of forming an optical device by using the present technology will be described. In this embodiment, an optical device is formed by preparing a transparent panel of a polycarbonate material having a curved surface shape as the transparent panel 4 and a liquid crystal display (LCD) as the optical member 2, and laminating the transparent panel and the liquid crystal display via an ultraviolet curable resin layer. On the transparent panel, a black frame-shaped light shielding portion is formed at positions corresponding to the peripheral edges of the display region of the liquid crystal display.

Prepared were transparent panels of W: 130 mm, L: 230 mm, thickness 3 mm, radius of curvature R: 600 (depth 4 mm). The size of the opening inside the light shielding portion was 108×195 mm. Two silicone rubbers (W: 10 mm, L: 140 mm, thickness: 10 mm) were prepared as the panel dams.

As the photocurable resin composition to fill the lamination side of the transparent panel and the photocurable resin composition to fill the resin filling space of the laminate, a UV-curable optical elastic resin (product name: 18V028-7, manufactured by Dexerials, viscosity: 30 mPa*s, density: 0.98 g/cm$^3$) was used. As a material for the dam member to be formed in the liquid crystal display, a UV-curable optical elastic resin (product name: CK202, manufactured by Dexerials, viscosity: 70,000 mPa*s, density: 0.98 g/cm$^3$) was used.

First, panel dams were provided along the outer edges of both open ends of the transparent panel. Next, the lamination side of the transparent panel was filled with the photocurable resin composition by using a dispenser (product name: ML-5000XII, manufactured by Musashi Engineering), and irradiated with an LED type UV irradiation device (product name: H-MB004, manufactured by HOYA) so as to completely cure the photocurable resin composition to form the first cured resin layer. The injecting amount of the photocurable resin composition was 72 g, and the photocurable resin composition was injected in the center of the lamination side and allowed to stand for 20 seconds for planarization. The UV irradiation conditions were 400 mW/cm$^2$ in illuminance and 8,000 mJ/cm$^2$ in cumulative light intensity.

Then, the photocurable resin composition was applied to the liquid crystal display by using a dispenser and cured by using an LED type UV irradiation device to form a dam member. A tapered nozzle (product name: TPND-18G, manufactured by Musashi Engineering) was used as an injection nozzle for the dispenser. The application conditions were a dispensing pressure of 0.3 MPa and a speed of 10 mm/sec. The UV irradiation conditions were 400 mW/cm$^2$ in illuminance and 8,000 mJ/cm$^2$ in cumulative light intensity.

Next, the transparent panel and the liquid crystal display were laminated, and the dam members were brought into close contact with the first cured resin layer. The photocurable resin composition was injected into the resin filling space of the laminate by using the dispenser and was completely cured by irradiating UV light from the transparent panel side by the LED type UV irradiation device. A vinyl tube of φ5 mm, used as the injection nozzle of the dispenser, was inserted into the resin filling space through the opening formed in the dam member. The injection was conducted at a dispensing pressure of 0.2 MPa and completed when the photocurable resin composition was injected up to the opening. The UV irradiation conditions were 400 mW/cm$^2$ in illuminance and 8,000 mJ/cm$^2$ in cumulative light quantity, and this final curing was carried out by a single UV irradiation without precuring.

Thus, the optical device was formed in which the transparent panel and the liquid crystal display were laminated via the cured resin layer. The obtained optical device was confirmed to have good visibility without leakage of the photocurable resin composition and without problem in bonding strength between the transparent panel and the liquid crystal display.

REFERENCE SIGNS LIST 1 optical device, 2 optical member, 3 cured resin layer, 4 transparent panel, 4a lamination side, 7 panel dam, 8 light shielding portion, 9 display portion, 10 photocurable resin composition, 13 dispenser, 14 cover member, 15 first cured resin layer, 16 dam member, 17 second cured resin composition, 20 resin filling space, 21 laminate, 22 precured resin layer

The invention claimed is:

1. A method for manufacturing an optical device, comprising:
    a step of preparing a transparent panel having a curved surface shape;
    a first filling step of filling a lamination side of the transparent panel with a curable resin composition;
    a first final curing step of curing the curable resin composition filled in the lamination side to form a first cured resin layer;
    a dam forming step of forming, on the transparent panel or an optical member to which the transparent panel is to be laminated, a dam member at a position along peripheral edges of a display region of the optical member;
    a laminating step of laminating the transparent panel and the optical member to form a laminate in which a resin filling space surrounded by the dam member is formed between the optical member and the transparent panel;
    a second filling step of filling the resin filling space with the curable resin composition;
    a precuring step of precuring the curable resin composition filled in the resin filling space to form a precured resin layer; and
    a second final curing step of final curing the precured resin layer.

2. The method for manufacturing the optical device according to claim 1, wherein the second final curing step cures the curable resin composition filled in the resin filling space without performing the precuring step.

3. The method for manufacturing the optical device according to claim 1, wherein one or more openings are formed in the resin filling space.

4. The method for manufacturing the optical device according to claim 3, wherein the openings are filled with the curable resin composition and sealed.

5. The method for manufacturing the optical device according to claim 3, wherein the curable resin composition is injected with the opening directed upward.

6. The method for manufacturing the optical device according to claim 1, wherein the transparent panel has a light shielding portion formed in a region corresponding to the peripheral edge of the display region of the optical member.

7. The method for manufacturing the optical device according to claim 6, wherein the curable resin is a photocurable resin, and the first final curing step irradiates curing light from above the light shielding portion.

8. The method for manufacturing the optical device according to claim 1,
    wherein the first cured resin layer has a flat surface, and
    wherein in the laminating step, the dam member abuts on the flat surface of the first cured resin layer.

9. The method for manufacturing the optical device according to claim 1, wherein the dam member is formed by applying and curing the same curable resin composition as the curable resin composition.

10. The method for manufacturing the optical device according to claim 1, wherein in the first filling step, a flexible and releasable panel dam is brought into close contact with the lamination side of the transparent panel.

* * * * *